United States Patent [19]

Onodera

[11] Patent Number: 5,506,975
[45] Date of Patent: Apr. 9, 1996

[54] VIRTUAL MACHINE I/O INTERRUPT CONTROL METHOD COMPARES NUMBER OF PENDING I/O INTERRUPT CONDITIONS FOR NON-RUNNING VIRTUAL MACHINES WITH PREDETERMINED NUMBER

[75] Inventor: Osamu Onodera, Hadano, Japan

[73] Assignee: Hitachi, Ltd., Tokyo, Japan

[21] Appl. No.: 165,916

[22] Filed: Dec. 14, 1993

[30] Foreign Application Priority Data

Dec. 18, 1992 [JP] Japan .................................. 4-339333

[51] Int. Cl.$^6$ ............................................. G06F 15/16
[52] U.S. Cl. ........................................... 395/375; 395/733
[58] Field of Search .................................. 395/500, 575, 395/725, 800, 375, 650

[56] References Cited

U.S. PATENT DOCUMENTS

| | | | |
|---|---|---|---|
| 4,523,206 | 6/1985 | Sasscer | 395/375 |
| 4,809,164 | 2/1989 | Fuller | 395/725 |
| 4,811,276 | 3/1989 | Suga | 395/275 |
| 4,812,967 | 3/1989 | Hirosawa et al. | 395/375 |
| 4,843,541 | 6/1989 | Bean et al. | 395/275 |
| 4,885,681 | 12/1989 | Umeno et al. | 395/275 |
| 4,887,202 | 12/1989 | Tanaka et al. | 395/500 |
| 4,969,164 | 11/1990 | Mehta et al. | 377/41 |
| 5,095,427 | 3/1992 | Tanaka et al. | 395/700 |
| 5,109,489 | 4/1992 | Umeno et al. | 395/275 |
| 5,155,858 | 10/1992 | DeBruler et al. | 395/800 |
| 5,303,382 | 4/1994 | Buch et al. | 395/725 |
| 5,319,753 | 6/1994 | Mackenna et al. | 395/275 |
| 5,361,375 | 11/1994 | Ogi | 395/800 |

OTHER PUBLICATIONS

Lattice Scheduling and Covert Channels, by Hu, IEEE 1992 Publication, pp. 52–61.
Analysis of Interrupt Handlings Schemes in Real–Time Systems by Fawaz et al, IEEE 1989, pp. 260–263.

*Primary Examiner*—Robert B. Harrell
*Assistant Examiner*—Zarni Maung
*Attorney, Agent, or Firm*—Fay, Sharpe, Beall, Fagan, Minnich & McKee

[57] ABSTRACT

A virtual machine system controls the operation of a plurality of virtual machines on a single computer and permits the computer to be switched from one virtual machine to another for carrying out urgent input/output operations. The decision to switch from an operating virtual machine to one of a plurality of other non-operating virtual machines is based on examining the number of input/output interrupt conditions that occur for each virtual machine other than the running one. When the number of input/output interrupt conditions for a virtual machine other than the running one is found to exceed a predetermined threshold number, operation of the currently running virtual machine is suspended. Control of the computer is then returned to the virtual machine control system to permit execution of another virtual machine so that the input/output interrupt condition for that virtual machine can be acknowledged.

16 Claims, 7 Drawing Sheets

VIRTUAL MACHINE I/O INTERRUPT CONTROL METHOD COMPARES NUMBER OF PENDING I/O INTERRUPT CONDITIONS FOR NON-RUNNING VIRTUAL MACHINES WITH PREDETERMINED NUMBER

FIELD OF THE INVENTION

The present invention relates to an information processing apparatus such as a virtual-machine system in general and in particular to a technique for controlling input/output interrupts in a virtual-machine system.

BACKGROUND OF THE INVENTION

In general, there are two techniques typically used for operating a computer of an information processing system. In one of the techniques, a single operating system, also referred to hereafter as an OS, is run on a real computer. In the other technique, a plurality of computers are each implemented as a virtual machine also known as a VM or an LPAR in a virtual-machine system. The virtual-machine system comprises a plurality of virtual machines and operating systems running on a single real computer. It should be noted that a real computer is also known as a physical computer.

A mode in which a single OS is running on a real (physical) computer is called a basic mode. A simplified configuration of hardware resources constituting a real computer in the basic mode is shown in FIG. 1. As shown in the figure, hardware resources of a real computer include one or more central processing units (referred to hereafter as CPUs), a single main storage unit (abbreviated hereafter to an MS) common to the CPUs, one or more channel paths (also called CHPS) and devices (also abbreviated to DEVs) connected to each channel path. These hardware resources constituting a real computer are treated as a single resource.

A mode, in which a plurality of LPARs are configured on a single real computer and a plurality of operating systems run thereon, is called an LPAR mode. A simplified configuration of hardware resources constituting a real computer in the LPAR mode is shown in FIG. 2. In general, in order to implement a plurality of LPARs on a single real computer, a system program known as a virtual-machine control program (abbreviated VMCP) is executed on the real computer. The LPARs are generated under the control of the VMCP and an independent OS is considered to run on each of the LPARs.

The VMCP has a function for allowing the hardware resources of the single real computer to be shared among the LPARs. Methods for allowing the hardware resources of the single real computer to be shared among the LPARs include a technique of allocating the hardware resources to the LPARs on a time-sharing basis under the control of the VMCP, a technique of allowing the LPARs to logically share and appear to exclusively occupy the hardware resources and a combination of both of these techniques. A conventional technique of allocating hardware resources of a single real computer to a plurality of LPARs is disclosed in a document such as IBM's publication entitled "Enterprise System/9000 Enterprise System/3090 Processor Resource/System Manager Planning Guide" (GA22-7123-4).

The technique of allocating input/output channels to LPARs introduced in the above publication is considered to be one of those described above. To be more specific, real CHPs are logically shared, allowing exclusive use by each LPAR. With this technique, subchannels of each real CHP are also logically shared, allowing exclusive use by each LPAR as well.

An example of general specifications concerning input/output instructions and input/output processings including the subchannels described in IBM's publication entitled "Enterprise System Architecture/390 Principles of Operation" (SA22-7201-00).

As shown in FIG. 1, the hardware resources of a real computer include two or more CPUs, one MS, two or more CHPs and a plurality of DEVs connected to each CHP.

In the configuration shown in FIG. 2, the hardware resources of the real computer used as the two CPUs are allocated in such a way that the two CPUs are each exclusively allocated to an LPAR. As for the hardware resource of the real computer serving as the common MS, its storage area is logically shared by and exclusively allocated to the two LPARs. Likewise, the hardware resources of the real computer serving as the four CHPs are logically shared by and exclusively allocated to the two LPARs. A group of DEVs connected to each CHP is exclusively allocated to one of the two LPARs in accordance with the exclusive allocation of the CHP to the LPAR. Similarly, a subchannel (referred to hereafter as a SCH) associated with a DEV is exclusively allocated to one of the two LPARs in accordance with the exclusive allocation of the DEV to the LPAR.

To be more specific, hardware resources CPU1, CHP1, CHP2, DEV11 to DEV1n and DEV21 to DEV2n are allocated to a virtual machine LPAR1, one of the two LPARs, whereas hardware resources CPU2, CHP3, CHP4, DEV31 to DEV3n and DEV41 to DEV4n are allocated to a virtual machine LPAR2, the other LPAR, as shown in FIG. 2. Here, the devices DEV11 to DEV1n, DEV21 to DEV2n, DEV31 to DEV3n and DEV41 to DEV4n are each allocated to one or more independent SCHs.

A relation among the LPARs, the CHP groups and the SCH groups is illustrated in FIG. 3. As shown in FIG. 3, each LPAR exclusively uses a CHP group pertaining to the LPAR whereas each CHP uses exclusively a SCH group pertaining to the CHP. As a result, each LPAR exclusively uses SCH groups pertaining to the LPAR.

To be more specific, a virtual machine LPAR 21 exclusively uses channel paths CHP21 and CHP22 pertaining thereto as shown in FIG. 3. The channel path CHP21 exclusively uses subchannels SCH211 to SCH21n pertaining thereto whereas the channel path CHP22 exclusively uses subchannels SCH221 to SCH22n pertaining thereto.

In addition, a virtual machine LPAR22 exclusively uses the channel paths CHP23 and CHP24 pertaining thereto as shown in the figure. The channel path CHP23 exclusively uses the subchannels SCH231 to SCH23n pertaining thereto whereas the channel path CHP24 exclusively uses the subchannels SCH241 to SCH24n pertaining thereto.

Next, an actual relation between the LPARs and the SCH groups is shown in FIG. 4. As shown in the figure, a virtual machine LPAR31 exclusively uses subchannels SCH311 to SCH31n pertaining thereto whereas a virtual machine LPAR32 exclusively uses subchannels SCH321 to SCH32n pertaining thereto.

In addition, the virtual machines LPAR31 and LPAR32 each use a logical input/output interrupt subclass number abbreviated thereafter to the LISC in order to perform control as to whether or not to acknowledge input/output interrupts for their SCH groups. General specifications of the logical input/output interrupt subclass number are described in a document such as the publication cited earlier.

A region ID abbreviated hereafter to an RID is assigned to each of the virtual machines LPAR31 and LPAR32 for use by a SCH group in the control for identifying the LPAR to which the SCH group pertains. The RID is assigned a value unique to the associated LPAR. Since the unique value is also held by all SCHs in the group pertaining to the LPAR, the SCH group holding the RID value can be associated to the LPAR.

For example, the virtual machine LPAR31 shown in FIG. 4 is assigned a LISC value of 1 and a RID value of 1. Accordingly, the SCH group comprising subchannels SCH311 to SCH31n are also assigned the LISC value 1 and the RID value 1. On the other hand, the virtual machine LPAR32 shown in FIG. 4 is assigned a LISC value of 2 and a RID value of 2. Accordingly, the SCH group comprising subchannels SCH321 to SCH32n are also assigned the LISC value 2 and the RID value 2. The virtual machine LPAR31 operates on the real computer with LISC=1 and RID=1 whereas the virtual machine LPAR32 operates on the real computer with LISC=2 and RID=2.

When an LPAR operates on the real computer as a virtual machine, the VMCP sets a logical input/output interrupt subclass mask in a control register, abbreviated hereafter to the LISCM, to the logic value 1 corresponding to the LISC value. General specifications of the logical input/output interrupt subclass mask in a control register are described in a document such as the publication described above.

The format of the LISCM is shown in FIG. 5. As shown, the control register is 32 bits in length. Bits 0 to 7 are used as LISCMs with each bit associated with LISC values 0 to 7. The remaining bits 8 to 31 are not used in this embodiment, but may be used in applications where more than seven LPARs are operational.

With the virtual machine LPAR31 operating on the real computer, the LISC is set to the logic value 1 as described earlier. Accordingly, bit 1 of the LISCM is set to the logic value 1 while bits 2 to 7 are set to the logic value 0. With the virtual machine LPAR32 operating on the real computer, the LISC is set to the value 2. Accordingly, bit 2 of the LISCM is set to the logic value 1 while bit 1 and bits 3 to 7 are set to the logic value 0. Bit 0 of the LISCM is used by the real computer, that is, by the VMCP. This bit is not available for use by the LPARs and is normally set to the logic value 1.

A timechart depicting allocation of the resources of the real computer to the VMCP and the virtual machines LPAR31 and LPAR32 is shown in FIG. 6. The figure shows resource allocation to the virtual machines LPAR31 and LPAR32 operating on the real computer. As shown in the figure, the sources of the real computer are allocated to the VMCP during periods of time 501, 503 and 505. The same resources are allocated to the virtual machines LPAR31 and LPAR32 during periods of time 502 and 504 respectively. During the periods of time 501, 503 and 505, the value of the LISCM expressed in binary format is '10000000'. Only input/output interrupts for input/output instructions issued at LISC=0 are acknowledged. Input/output interrupts for input/output instructions issued at LISC=1 and LISC=2 are, however, pending and held by hardware.

With the virtual machine LPAR31 running during the period of time 502, the value of the LISCM expressed in binary format is '11000000' acknowledging only input/output interrupts for input/output instructions issued at LISC=0 and LISC=1. Input/output interrupts for input/output instructions issued at LISC=2 are, however, pending and held by the hardware.

With the virtual machine LPAR32 running on during period of time 502, on the other hand, the value of the LISCM expressed in binary format is '10100000' acknowledging only input/output interrupts for input/output instructions issued at LISC=0 and LISC=2. Input/output interrupts for input/output instructions issued at LISC=1 are, however, pending and held by the hardware.

Accordingly, input/output interrupts for LISC=2 occurring during the period of time 502 are held by the hardware and not acknowledged until the period of time 504 in which the virtual machine LPAR32 is dispatched by the VMCP. Likewise, input/output interrupts for LISC=1 occurring during the period of time 504 are thus held by the hardware and not acknowledged until a period in which the virtual machine LPAR31 is dispatched by the VMCP.

SUMMARY OF THE INVENTION

In the conventional techniques described above a shortcoming occurs since the input/output interrupts of an LPAR, which occur while input/output interrupts of another LPAR are acknowledged, are pending and held by the hardware until the LPAR is dispatched by the VMCP. In particular, this shortcoming gives rise to a severe problem when the time slice, in which an LPAR is dispatched by the VMCP, is long.

In addition, with a time slice of an LPAR lengthened, the wait time for a pending input/output interrupt of another LPAR to be acknowledged is also prolonged as well. As a result, the response of the input/output unit becomes slow.

If the time slices of the LPARs are shortened, the dispatching frequency at which the LPARs are switched from one to another by the VMCP is inevitably increased, raising the LPAR-switching overhead incurred by the virtual-machine system. As a result, the performance of the virtual-machine system is adversely affected, giving rise to another problem which cannot be ignored.

It is then an object of the present invention to provide a technique of controlling input/output interrupts for a virtual-machine system wherein, in the event of an input/output interrupt occurring for a non-running virtual machine during the operation of a running virtual machine, the cumulative count of input/output interrupt conditions is examined for the non-running virtual machine(s) to determine whether the operation of the currently running virtual machine is to be continued or suspended, and if the result of the examination indicates that the operation of the virtual machine is to be suspended, control is returned to the VMCP.

In particular, the present invention provides a technique for controlling interactions of input/output interrupts of a plurality of virtual machines operating on a single real computer in a virtual-machine system wherein pending input/output interrupt parameters showing the absence/presence of pending input/output interrupt conditions held by the real computer for the virtual machines are acknowledged for each virtual machine depending upon an input/output interrupt pending state of the virtual machine independently of the values of the pending input/output interrupt masks.

In addition, when recognizing the pending input/output interrupt parameters indicating the absence/presence of pending input/output interrupt conditions held by the real computer for the virtual machines, the information associated with the identified pending input/output interrupt conditions is not cleared.

Further, when recognizing the pending input/output interrupt parameters indicating the absence/presence of pending input/output interrupt conditions held by the real computer for each virtual machine, the pending input/output interrupt conditions are acknowledged only when the number of pending input/output interrupt conditions exceeds a certain predetermined threshold value. Otherwise, the existence of the pending input/output interrupt conditions is ignored. In other words, the pending input/output interrupt conditions are kept in a pending state.

Moreover, in the implementation of a function to acknowledge or ignore the existence of pending input/output interrupt conditions based on the comparison of the number of pending input/output interrupt conditions to a threshold value, a field of an operand of an instruction for activating each virtual machine is used for specifying the threshold value. If the existence of pending input/output interrupt conditions is acknowledged, the operation of a virtual machine currently running on the real computer is suspended and control is returned to the VMCP. This technique of controlling input/output interrupts allows pending input/output interrupt conditions for non-dispatched LPARs to be held in hardware managed by the VMCP until the LPAR is dispatched, whereupon the dispatched LPAR recognizes and acknowledges the input/output interrupt condition and receives the interrupt information directly.

In addition, as the number of pending input/output interrupt conditions held in the hardware for an LPAR other than the LPAR dispatched by the VMCP exceeds a predetermined threshold value, the other LPAR can be dispatched without regard to the time slice of the previously dispatched LPAR, that is, the other LPAR can be dispatched even prior to the end of the time slice of the previously dispatched LPAR.

In a conventional system using simulated architecture, every LPAR has its pending input/output interrupt conditions recognized and held in the hardware for the LPAR. Then, when the LPAR for which the input/output interrupt condition has already been acknowledged is later dispatched by the VMCP, the VMCP simulates an interrupt condition from input/output hardware. This simulated interrupt condition is acknowledged and the dispatched LPAR receives the interrupt data from the VMCP as opposed to directly from the input/output hardware. However, as the time slice of an LPAR dispatched by the VMCP is lengthened, without the control technique of the present invention implemented, the wait time for the hardware-held pending input/output interrupt conditions, which pertain to an LPAR other than the dispatched LPAR become longer as well, giving rise to a shortcoming that the response characteristic of the input/output unit is slow. The control technique of the present invention eliminates this and the other shortcomings. In this way, a compact and high-performance technique of controlling input/output interrupts is implemented for a virtual-machine system.

DETAILED DESCRIPTION OF THE PREFERRED EMBODIMENTS

Figure 1:
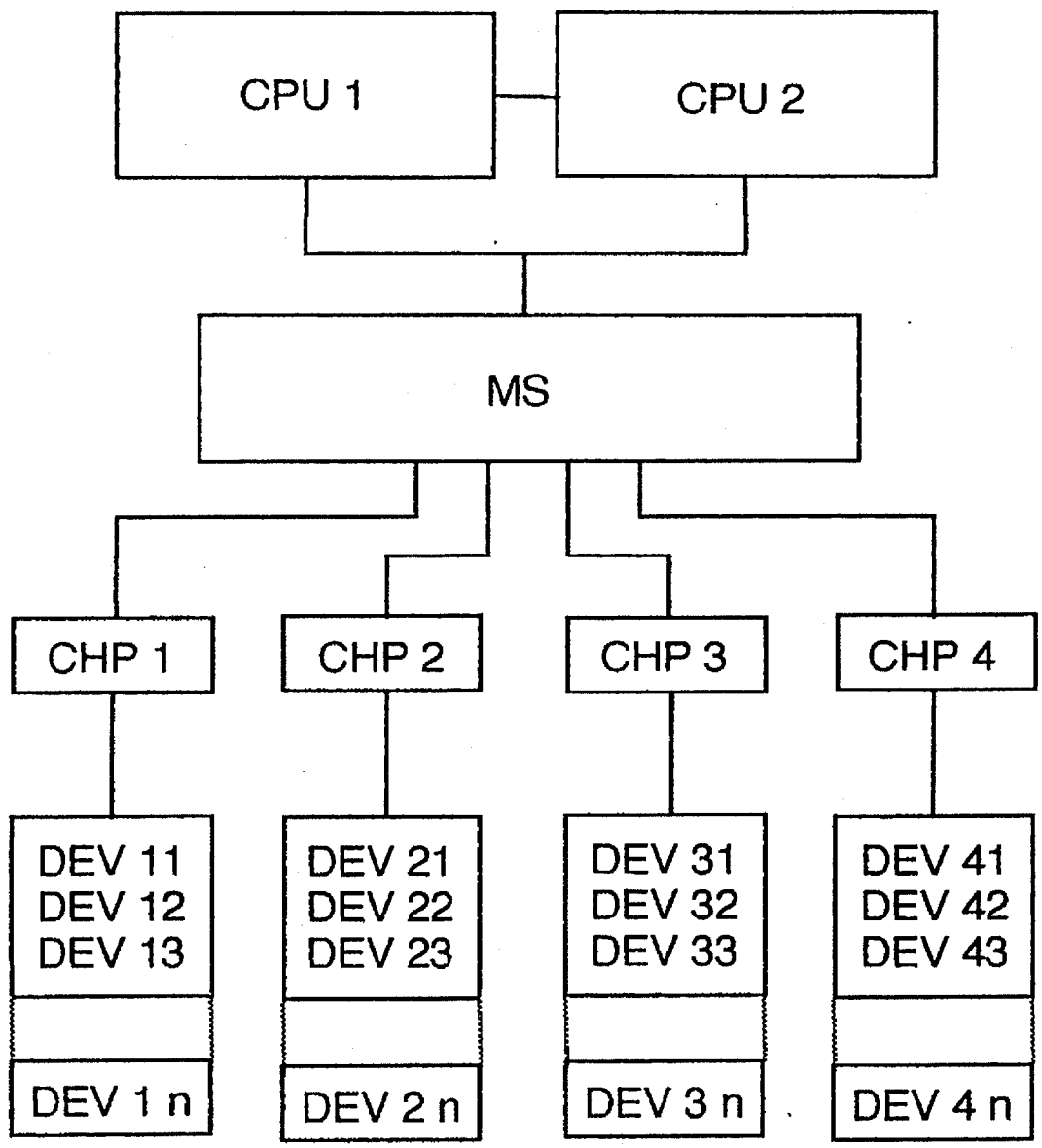
FIG. 1 is a block diagram of hardware resources constituting a real computer operating in a basic mode.
Figure 2:
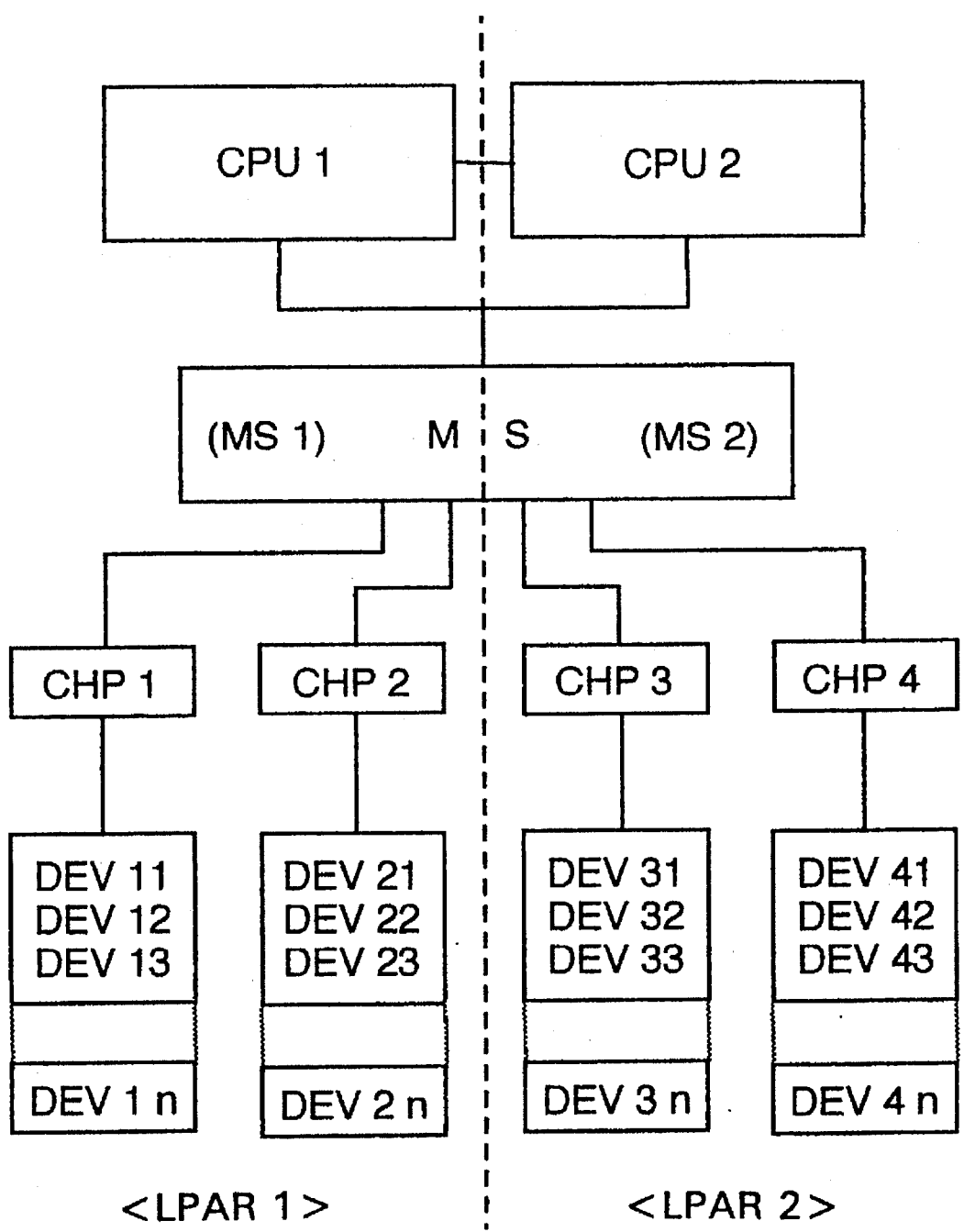
FIG. 2 is a block diagram of hardware resources constituting a real computer operating in a virtual-machine (LPAR) mode.
Figure 3:
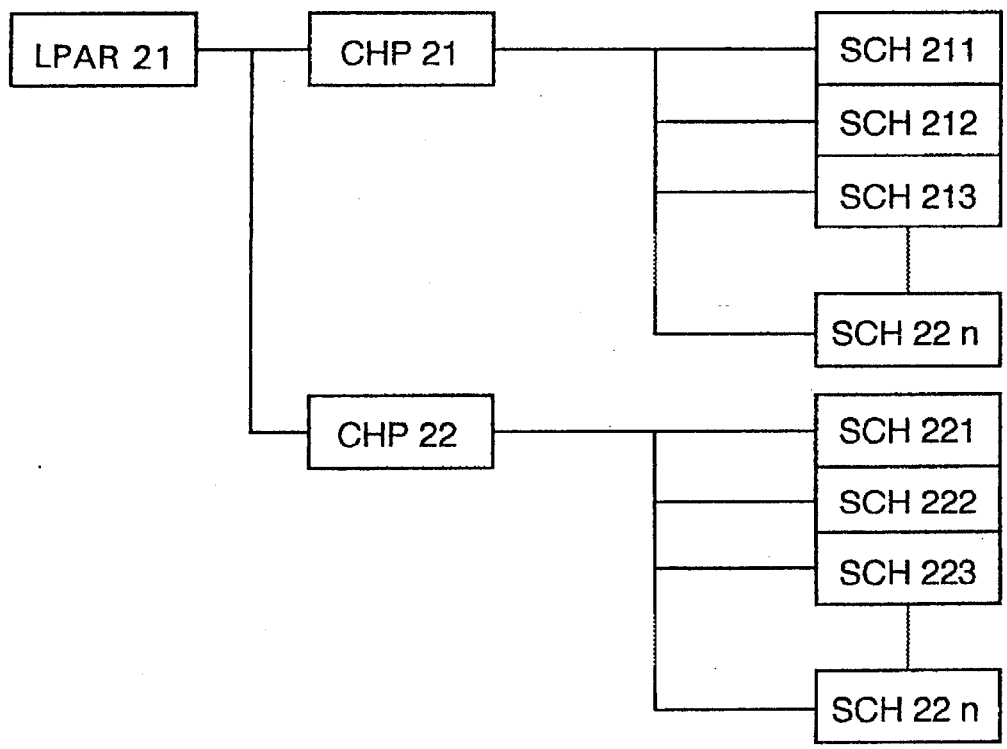
FIG. 3 is a block diagram showing the relationship between a group of LPARs and groups of subchannels (SCHs) each assigned to an LPAR of the LPAR group.
Figure 3:
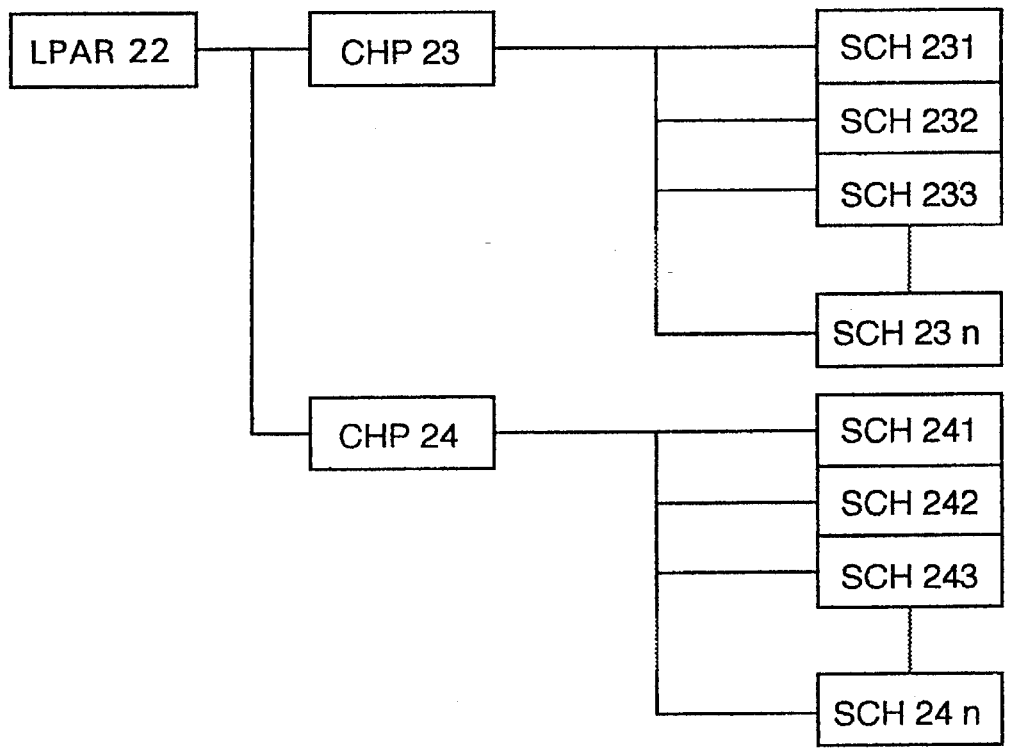
Figure 4:
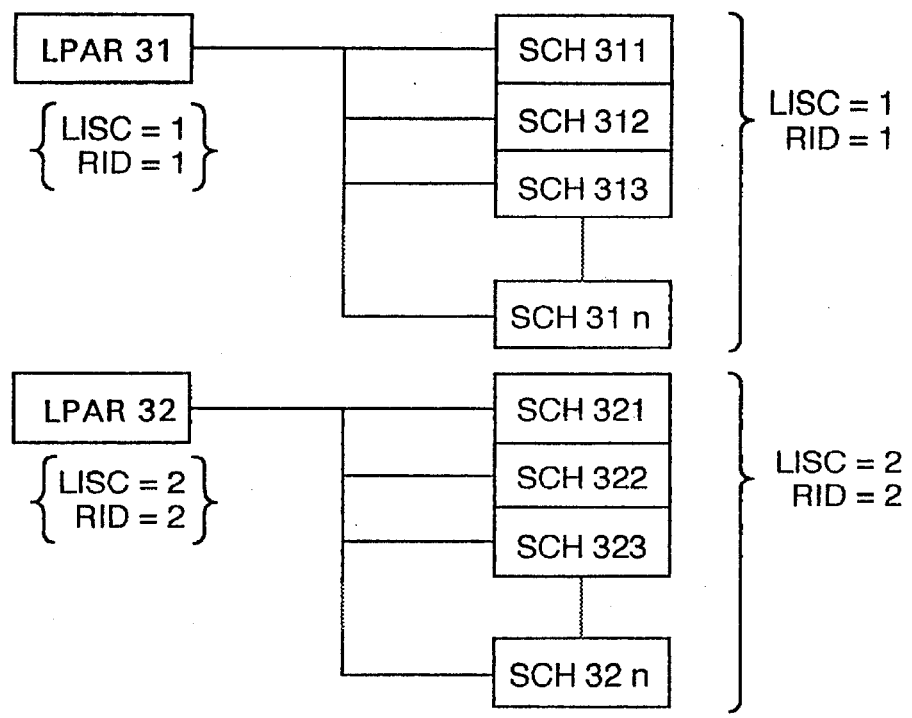
FIG. 4 is a conceptual diagram showing in more detail the relationship between the group of LPARs and the groups of subchannels (SCHs) each assigned to an LPAR of the LPAR group.
Figure 5:
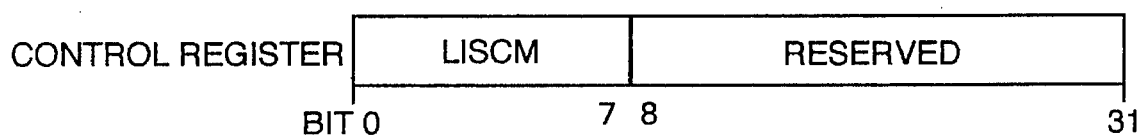
FIG. 5 is a conceptual diagram showing the format of a logical input/output subclass mask (LISCM) in a control register.
Figure 6:
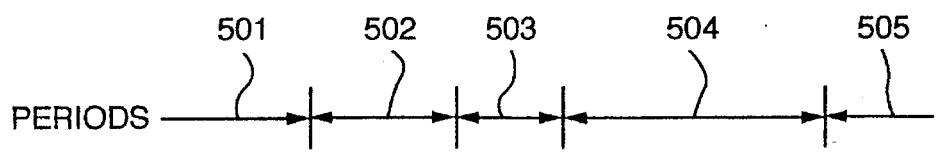
FIG. 6 is a simplified explanatory diagram showing a timechart of the operation of a virtual-machine system comprising a plurality of virtual machines running on a real computer.
Figure 6:
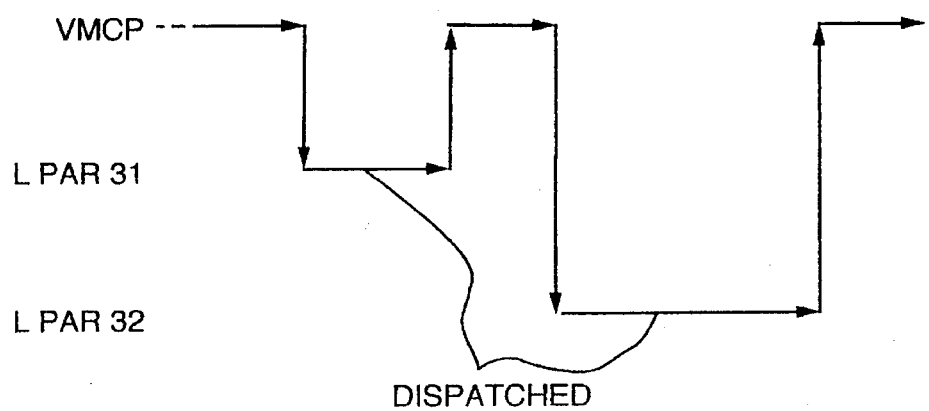
Figure 8:
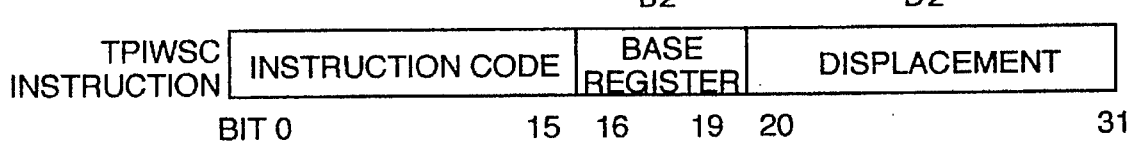
FIG. 8 shows the format of an instruction used in a technique for controlling input/output interrupts in a virtual-machine system operating according to the present invention.
Figure 7:
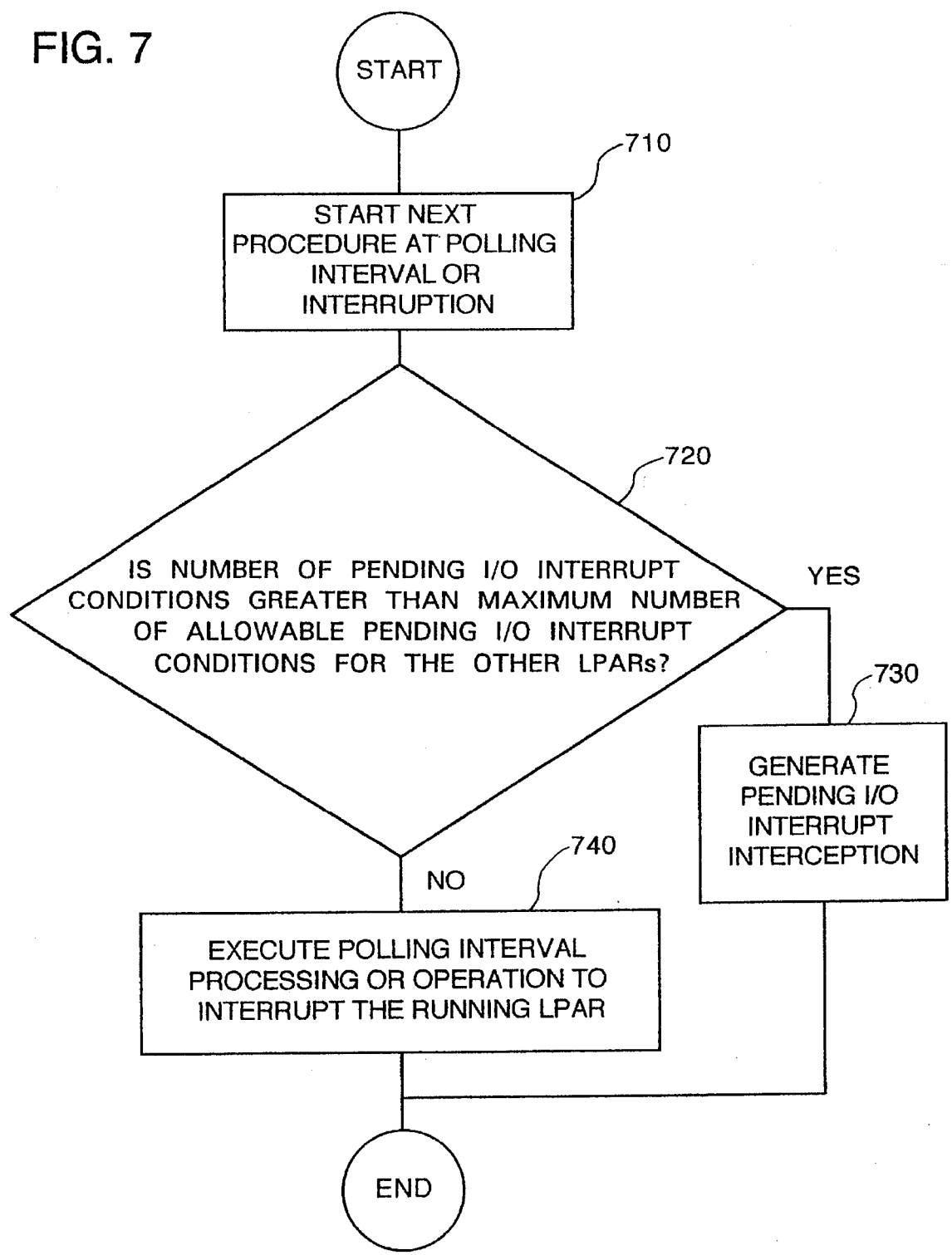
FIG. 7 shows a flowchart of a procedure for acknowledging pending input/output interrupts in accordance with a technique for controlling input/output interrupts in a virtual-machine system operating according to the present invention.
Figure 9:
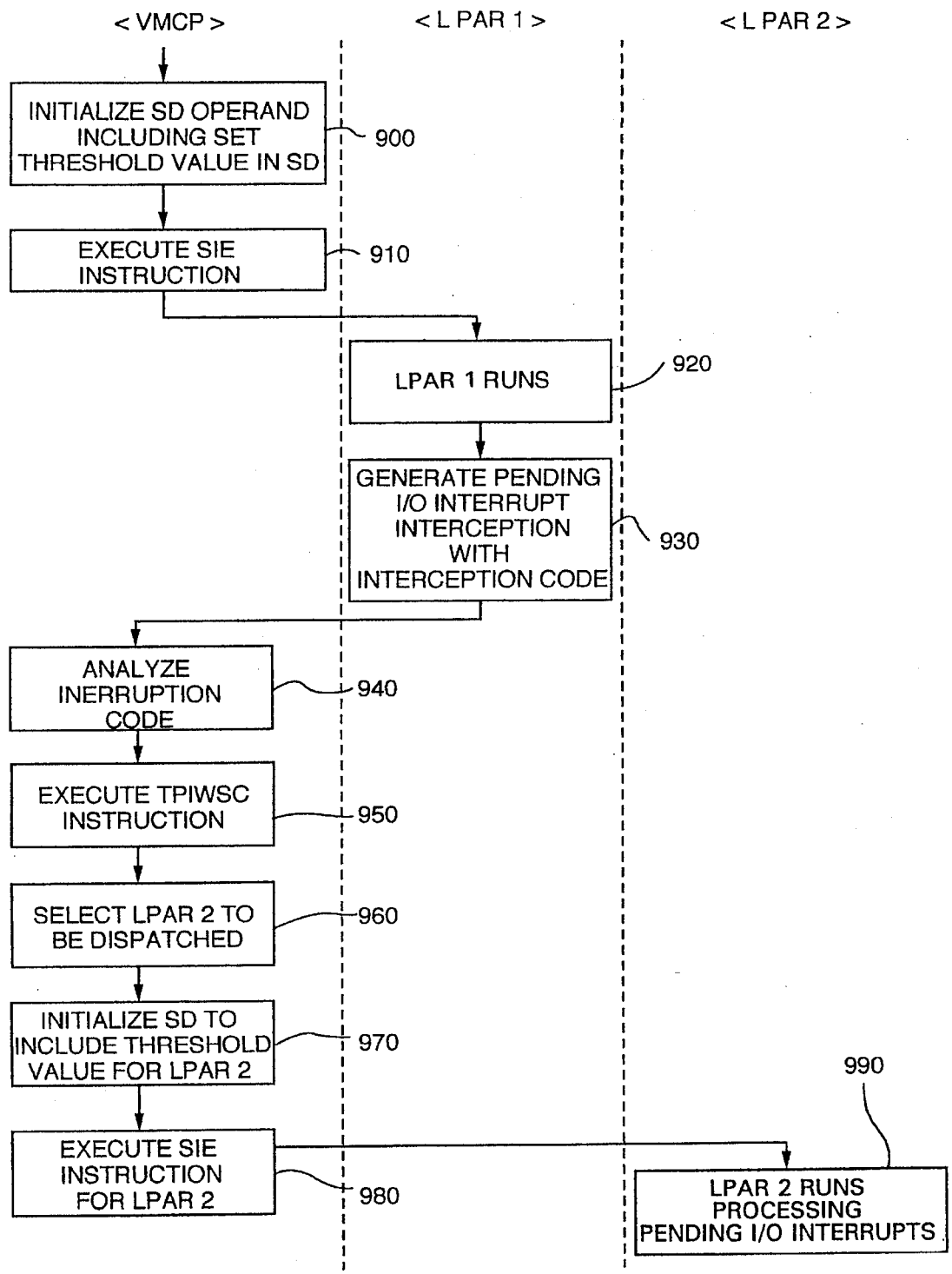
FIG. 9 is a diagram showing a flowchart of a procedure for dispatching another LPAR upon acknowledgment of an input/output interrupt conditions followed in a technique of controlling input/output interrupts for a virtual machine system in accordance with the present invention.

A flowchart of a procedure for acknowledging the existence of pending input/output interrupt conditions according to a method for controlling a virtual machine system is shown in FIG. 7. The procedure is adopted in accordance with the present invention. FIG. 8 shows a simplified diagram used for explaining the format of an instruction used in the technique of controlling input/output interrupts in accordance with the present invention. FIG. 9 shows a flowchart of a procedure for dispatching another LPAR upon acknowledgment of a pending input/output interrupt condition.

First, the technique for controlling input/output interrupts implemented in the embodiment of a virtual-machine system in accordance with the present invention is described with reference to FIG. 7. In the technique of controlling input/output interrupts for a virtual-machine system implemented according to this embodiment, the existence of pending input/output interrupt conditions held in the real computer for a virtual machine other than the one dispatched by the VMCP is examined. If the number of pending input/output interrupt conditions for a virtual machine other than the dispatched one exceeds a threshold value, control is returned to the VMCP of the virtual-machine system.

Implementing this technique according to one embodiment of the invention includes first activating a procedure for recognizing pending input/output interrupts. This can be accomplished when polling intervals of the CPU occur or when an interrupt to the currently operating LPAR is triggered, for example. Then, the number of pending input/output interrupt conditions held by the hardware for each LPAR other than the dispatched one is compared to a threshold value, which is a predetermined maximum number of allowable pending input/output interrupt conditions held in the hardware. A pending input/output interrupt interception is generated when the number of pending input/output interrupt conditions held by the hardware for one of the other LPARs is found in the comparison to be greater than the maximum number of allowable pending input/output interrupt conditions held in the hardware.

Next, the format of an instruction that is adopted in implementing the technique of the present invention is explained by referring to FIG. 8. This instruction is called a Test Pending Interruption With Subclass (TPIWSC) instruction. Bits 0 to 15 of the instruction word are an instruction code whereas bits 16 to 19 are used for specifying a base register B2 used by the instruction. Bits 20 to 31 specify a displacement D2. The format of this instruction is known as an S format. General specifications of an S-formatted instruction are described in IBM's publication entitled "Enterprise System Architecture/390 Principles of Operation" (SA22-7201-00).

The operation of the instruction is as follows. The instruction is used for storing the number of pending input/output interrupt conditions for a subclass. A second operand (B2 and D2) is used for specifying the start address of an entry into which the number of pending input/output interrupt conditions for a subclass is to be stored. The number of entries each for storing the number of pending input/output interrupt conditions for a subclass is equal to the number of bits for input/output interrupt subclasses in a control register. The length of an entry for storing the number of pending input/output interrupt conditions for a subclass is preferably 32 bits or 4 bytes. It should be noted that a stored input/output interrupt condition of a pending input/output interrupt for a subclass is not cleared.

When the CPU makes an attempt to execute this instruction in the course of an application program or a user program, a privilege-instruction exception is generated, canceling the executing of the instruction. A specification exception can also occur because the start address of an entry for storing the number of pending input/output interrupt conditions for a subclass specified by the second operand is not a boundary address. In this case, the execution of the instruction is also canceled. An access exception can also be generated in an attempt to access the address specified by the second operand. General specifications of the privilege-instruction, specification and access exceptions are described in a document such as IBM's publication entitled "Enterprise System Architecture/390 Principles of Operation" (SA22-7201-00).

Otherwise, the instruction is executed normally. If the pending input/output interrupt condition counts stored for all subclasses are zeros, a condition code is set to zero. If an entry for storing a pending input/output interrupt condition count is found to be non-zero, the condition code is set to one. It should be noted that a condition code of 2 or 3 is not used. The value of the condition code thus indicates whether or not a pending input/output interrupt condition exists.

Next, the procedure for acknowledging the existence of pending input/output interrupt conditions used in the present invention is described by referring to FIG. 7. As shown in the figure, the procedure begins with a step 710 of initiating a procedure for acknowledging pending input/output interrupts. For example, the procedure can be initiated at polling intervals (determined by hardware) of the CPU or in synchronization with operations to execute any interrupt (external interruption) of a running LPAR dispatched by the VMCP. It should be noted that the LPARs are dispatched by the VMCP by executing an SIE (Start Interpretive Execution) instruction, which is an instruction for activating an LPAR and running the LPAR in an interpretive execution mode referred to hereafter as an IE mode. In this embodiment, the procedure for acknowledging pending input/output interrupts is implemented as a microprogram of the CPU. General specifications of the SIE instruction and the IE mode are described in detail in IBM's publication entitled "IBM System/370 Extended Architecture Interpretive Execution" (SA22-7095).

Next, at a step 720 following the initiation of the microprogram of the CPU implementing the procedure for acknowledging pending input/output interrupt conditions, the microprogram of the CPU references an input/output interrupt control region of a hardware system area, referred to by the abbreviation hereinafter as an HSA, in the main storage unit. Pending input/output interrupt condition counts stored in the input/output interrupt control region for all subclasses are compared to a threshold number set as a specific entry of a state description (abbreviated hereafter to an SD), which is an operand of the SIE instruction specified in the issuance of the SIE instruction. It should be noted that the input/output interrupt control region itself is not shown in the figure.

In the specific entry of the SD, a pending input/output interrupt conditions maximum count for all LPARs except the one that is currently running has been set by the VMCP. If the number of pending input/output interrupts for an LPAR subclass other than the running one is found to be greater than the pending input/output interrupt maximum count for the LPAR, the procedure flow continues to a step 730. Otherwise, the flow continues to a step 740 for carrying out a polling interval processing or an operation to interrupt the LPAR. At the step 740, the procedure initiated for acknowledging an input/output interrupt is ended.

That is to say, if the number of pending input/output interrupts for an LPAR subclass other than the running one is found to be equal to or smaller than the pending input/output interrupt maximum count for the LPAR, the procedure flow continues to the step 740 for carrying out the processing again at the next polling interval or when an operation to interrupt the LPAR is again activated.

At the step 730, which follows when a determination is made in step 720 that the maximum number of I/O interrupts has been exceeded, the CPU microprogram suspends the on-going processing in the IE mode, and generates a pending input/output interrupt interception. Control is then passed to the VMCP. General specifications of the interception are described in detail in a document such as IBM's publication entitled IBM System/370 Extended Architecture Interpretive Execution" (SA22-7095). The VMCP then analyzes the condition of the pending input/output interrupt interception and proceeds in accordance with the program logic of the VMCP.

Next, effects of the technique for controlling input/output interrupts of a virtual-machine system adopted in the embodiment are explained by referring to FIG. 9. First of all, the VMCP initializes the SD operand of an SIE instruction for activating an LPAR at a step 900 prior to the activation of the LPAR. The SD includes the allowable pending input/output interrupt maximum count for all LPARs except the currently running one. This value is stored in the specific entry of the SD, stored in main memory for example, and used in step 720 as set forth in the description accompanying FIG. 7. At the following step 910, the VMCP executes the SIE instruction with the initialized SD used as an operand. At a step 920, the LPAR activated by the SIE instruction, the virtual machine LPAR1 in this case, is operated in the IE mode.

At a subsequent step 930, the procedure for acknowledging pending input/output interrupts is initiated at a polling interval of the CPU or in synchronization with operations to interrupt the LPAR, for example. As the procedure for acknowledging pending input/output interrupts is initiated, the CPU references the input/output interrupt control region in the HSA of the main storage unit to read pending input/output interrupt condition counts for all subclasses, except the activated LPAR, which are then each compared to the corresponding maximum number of pending input/ output interrupt conditions that can be held for an LPAR as specified by the SD operand at the issuance of the SIE instruction.

If the number of pending input/output interrupts for an LPAR subclass other than the running one is found to be greater than the maximum number of pending input/output interrupt conditions stored in the specific entry of the SD, the operation of the LPAR running in the IE mode is suspended and a pending input/output interrupt interception is generated. Control is then passed to the VMCP.

At the following step 940, the condition of the interception is analyzed by the VMCP to determine whether or not it is a pending input/output interrupt interception. If the interception is found to be a pending input/output interrupt interception, the flow continues to a step 950 to execute a TPIWSC instruction. Otherwise, the interception is handled in the same way as the conventional one.

At the step 950, the VMCP executes the TPIWSC instruction to obtain pending input/output interrupt condition counts for all LPAR subclasses. At a subsequent step 960, the VMCP examines each of the pending input/output interrupt condition counts for all LPAR subclasses in order to determine an LPAR to be dispatched next. In general, an LPAR with a largest pending input/output interrupt condition count is selected. Alternatively, the pending input/ output interrupt interception could have a designation code or otherwise provide a designation of a location for designating the next LPAR to be dispatched on the basis of the same or other criteria.

Later on, at the following step 970, the VMCP initializes SD values associates with the selected LPAR, the virtual machine LPAR2. As described above, initial values of the SD include allowable pending input/output interrupt maximum counts for all LPARs, except the currently running one.

At a subsequent step 980, the VMCP executes an SIE instruction with the initialized SD used as an operand to activate the selected LPAR. In this way, the virtual machine LPAR2 is activated. Then, at step 990, the LPAR activated by the SIE instruction, the virtual machine LPAR2 in this case, starts operating in the IE mode. As the activated LPAR (LPAR2) starts operating in the IE mode, the pending input/output interrupt conditions held for that LPAR generate an input/output interrupt which is acknowledged and handled by the running OS (operating system) of the LPAR in a direct execution mode.

As described above, this technique of controlling pending input/output interrupts for a virtual-machine system permits the real computer to be switched from one virtual machine to another for carrying out urgent input/output operations with the decision to switch to the other virtual machine being based on the occurrence of the number of pending input/ output interrupt condition counts for a virtual machine, other than the operating one, exceeding a predetermined number. As a result, an efficient input/output response characteristic of the virtual-machine system is provided.

So far, one embodiment has been used for explaining the present invention. It should be noted, however, that applications of the present invention are not limited to the above embodiment. That is to say, one of ordinary skill in the art would know of a variety of modifications to the present invention that are possible in view of the teachings set forth herein.

For example, the described embodiment implementing the virtual-machine system mentions only two virtual machines for clarity. As stated above, however, applications of the present invention are not limited to this embodiment. To be more specific, the present invention can also be widely applied to a virtual-machine system comprising more than two virtual machines as well.

Representative effects of the present invention disclosed in this specification are explained in brief as follows.

The present invention provides a technique for controlling input/output interrupts of a plurality of virtual machines operating on a single real computer in a virtual-machine system wherein input/output interrupt parameters showing the absence/presence of pending input/output interrupt conditions held by the real computer for the virtual machines are recognized for each input/output interrupt subclass depending upon an input/output interrupt pending state of the virtual machine independently of the value of an input/ output interrupt mask.

In addition, when recognizing the input/output interrupt parameters indicating the absence/presence of pending input/output interrupt conditions held by the real computer for the virtual machines, the information associated with the identified input/output interrupt condition is not cleared, allowing the VMCP to treat the acknowledged pending input/output interrupt conditions as internal input/output interrupts of the VMCP.

Further, when recognizing the pending input/output interrupt parameters indicating the absence/presence of pending input/output interrupt conditions held by the real computer for each virtual machine, the pending input/output interrupt conditions held in the hardware for any LPAR other than the running one are acknowledged when the number of pending input/output interrupt conditions exceeds a certain predetermined threshold value even if the LPAR dispatched by the VMCP is still operating. As a result, the operation of the running LPAR is suspended by the hardware and control can thus be returned to the VMCP. If the number of pending input/output interrupt conditions is smaller than the threshold value, on the other hand, the pending input/output interrupt conditions are kept in a pending state.

Moreover, in the implementation of a function to acknowledge or ignore the existence of pending input/output interrupt conditions based on the comparison of the number of pending input/output interrupt conditions to a threshold value, a field of an operand of an instruction for activating a virtual machine is used for specifying the threshold value. As a result, the threshold value can be dynamically changed every time the VMCP activates a virtual machine.

As described above, the technique of controlling input/ output interrupts adopted by the virtual-machine system according to the present invention allows an input/output interrupt condition held in the hardware for any arbitrary LPAR to be recognized. As the number of input/output interrupt causes held in the hardware for an LPAR other than the LPAR dispatched by the VMCP exceeds a predetermined threshold value, the other LPAR can be dispatched without regard to the time slice of the dispatched LPAR, that is, the other LPAR can be dispatched even prior to the end of the time slice. Any LPAR has its pending input/output interrupt conditions recognized and held in the hardware for the LPAR. However, as the time slice of an LPAR dispatched by the VMCP is lengthened, without this control technique, the wait time for hardware-held pending input/output interrupt conditions, which pertain to an LPAR other than the dispatched LPAR, to be acknowledged would otherwise become longer as well, giving rise to a shortcoming that the response characteristic of the input/output unit is slow. The control technique eliminates this shortcoming. In this way, a compact and high-performance technique of controlling input/output interrupts can therefore be implemented for a virtual-machine system.

I claim:

1. A method of operating a plurality of virtual machines running on a computer having a central processing unit (CPU), comprising the steps of:

generating a logical partition (LPAR) for each of said virtual machines and allocating hardware resources on a time-sharing basis to each of said LPARs, including exclusive devices and channels for each of said LPARs, each said LPAR initialing input/output operations and receiving input/output interrupt responses through said channels;

controlling dispatching of each of said LPARs with a virtual machine control program that dispatches one of said LPARs at a time;

after one said LPAR has been dispatched by said virtual machine control program, acknowledging input/output interrupts for only said dispatched LPAR and said virtual machine control program, and holding input/output interrupt conditions pending for each of said LPARs other than said dispatched LPAR;

counting an occurrence of each of said pending input/output interrupt conditions for each of said LPARs other than said dispatched LPAR to obtain a count and comparing said count to a predetermined threshold number;

continuing said holding when said count is equal to or less than said threshold number;

suspending running of said dispatched LPAR and returning control of said computer to said virtual machine control program when said count exceeds said threshold number;

selecting a next to be dispatched one of said LPARs and dispatching said selected LPAR with said virtual machine program;

wherein said control ling of said dispatching of each of said LPARs includes dispatching each said LPAR with a start interpretive execution instruction having an operand that specifies said threshold number, and registering said threshold number with said virtual machine control program for a dispatched LPAR.

2. The method according to claim 1, wherein after said selected LPAR has been dispatched, respective ones of said pending input/output interrupt conditions for said selected LPAR are acknowledged and said acknowledging, holding, counting, comparing and returning control steps are repeated for said selected LPAR.

3. The method according to claim 1, wherein said controlling of the dispatching of said LPARs is controlled according to a time-slice scheduling method and said step of suspending running of said dispatched LPAR is executed before a predetermined time slice elapses when said count exceeds said threshold number.

4. The method according to claim 1, wherein said selecting step includes determining which of said LPARs has a greatest number of pending input/output interrupt conditions and selecting said LPAR with said greatest number of pending input/output interrupt conditions as said next to be dispatched LPAR.

5. The method according to claim 1, wherein said comparing step is initiated at one of a polling interval of said CP or when an interrupt to said dispatched LPAR occurs.

6. A method of operating a computer having at least a central processing unit (CPU), main storage, channels and input/output devices connected to the main storage through the channels, comprising the steps of:

configuring said computer to run a plurality of operating systems including generating a logical partition (LPAR) for each said operating system and exclusively allocating hardware resources of said computer to each said LPAR on a time sharing basis under control of a virtual machine control program;

sending input/output instructions to a plurality of said devices through a plurality of said channels and unsynchronously receiving corresponding input/output interrupt conditions through the channels;

controlling acknowledging of said input/output interrupt conditions for a dispatched LPAR so that only input/output interrupt conditions corresponding to said dispatched LPAR are acknowledged;

recognizing and holding the input/output interrupt conditions in a pending state for each of said LPARs other than a dispatched one of said LPARs;

registering data of counts of each of said pending input/output interrupt conditions for each of said LPARs other than a dispatched one of said LPARs and comparing each of said counts to a predetermined threshold number;

suspending running of the operating system of a dispatched LPAR when one of said counts for a corresponding said LPAR exceeds said threshold number including returning control of said computer to said virtual machine control program;

reading said registered data of counts and determining from said registered data of counts which of said LPARs is to be dispatched next;

dispatching said next to be dispatched LPAR; and said dispatching including dispatching each said LPAR with a start interpretive execution command having an operand specifying said threshold number, and registering said threshold number with said virtual machine control program for a dispatched LPAR.

7. The method according to claim 6, further including in said determining step, determining a greatest one of the counts of pending input/output interrupt conditions from said data of counts and in said dispatching step, selecting said LPAR having said greatest count of said next to be dispatched LPAR.

8. The method according to claim 6, wherein said sending step includes identifying said plurality of the devices and channels through which said input/output instructions are sent by a subclass and identifying said corresponding input/output interrupt conditions that are received for each subclass by a logical interrupt subclass number (LISC); and wherein said controlling acknowledging of input/output interrupt conditions includes setting a logical input/output interrupt subclass mask (LISCM) for each dispatched LPAR so that only input/output interrupt conditions of one said LISC corresponding to the LISCM of the dispatched LPAR are acknowledged.

9. The method according to claim 6, wherein said comparing step is initiated at one of a polling interval of said CPU or when an interrupt to the currently dispatched LPAR is triggered.

10. The method according to claim 8, wherein said CPU executes a test pending interruption with subclass instruction for storing said data of counts of pending input/output interrupt conditions for each said subclass in a hardware storage area of said main storage.

11. The method according to claim 10, further comprising executing said test pending interrupt with subclass instruction in said analyzing step to determine which said LPAR has a greatest number of pending input/output interruption conditions, and dispatching said LPAR having said greatest number of pending input/output interrupt conditions as said next to be dispatched LPAR.

12. The method according to claim 6, wherein after said next to be dispatched LPAR is dispatched, respective ones of said pending input/output interrupt are executed.

13. The method according to claim 6, wherein in said comparing step, said suspending running step is executed by said CPU according to a microprogram stored in said main storage.

14. The method according to claim 6, wherein said suspending step includes executing a pending input/output interrupt interception for returning control of said computer to said virtual machine program.

15. The method according to claim 13, wherein said micro program is executed at one of a polling interval of said CPU for when an interrupt to the currently dispatched LPAR is triggered.

16. A method of operating a plurality of virtual machines running on a computer having a central processing unit (CPU), comprising the steps of:

generating a logical partition (LPAR) for each of said virtual machines and allocating hardware resources on a time-sharing basis to each of said LPARs, including exclusive devices and channels for each of said LPARs, each said LPAR initialing input/output operations and receiving input/output interrupt responses through said channels;

controlling dispatching of each of said LPARs with a virtual machine control program that dispatches one of said LPARs at a time;

after one said LPAR has been dispatched by said virtual machine control program, acknowledging input/output interrupts for only said dispatched LPAR and said virtual machine control program, and holding input/output interrupt conditions pending for each of said LPARs other than said dispatched LPAR;

counting an occurrence of each of said pending input/output interrupt conditions for each of said LPARs other than said dispatched LPAR to obtain a count and comparing said count to a predetermined threshold number;

continuing said holding when said count is equal to or less than said threshold number;

suspending running of said dispatched LPAR and returning control or said computer to said virtual machine control program when said count exceeds said threshold number;

selecting a next to be dispatched one of said LPARs and dispatching said selected LPAR with said virtual machine program;

wherein said selecting step includes determining which of said LPARs has a greatest number of pending input/output interrupt conditions and selecting said LPAR with said greatest number of pending input/output interrupt conditions as said next to be dispatched LPAR; and wherein said dispatching includes dispatching each said LPAR with a start interpretive execution command having an operand specifying said threshold number, and registering said threshold number with said virtual machine control program for a dispatched LPAR.

\* \* \* \* \*